United States Patent [19]

Cohen

[11] Patent Number: 5,434,197

[45] Date of Patent: Jul. 18, 1995

[54] NEAR INFRA-RED ABSORBING THERMALLY STABLE POLYMER BLEND

[75] Inventor: Leslie A. Cohen, Langhorne, Pa.

[73] Assignee: Atohaas B.V., Haarlem, Netherlands

[21] Appl. No.: 273,675

[22] Filed: Jul. 12, 1994

[51] Int. Cl.$^6$ ................................................ C08K 5/36
[52] U.S. Cl. ................................... 523/135; 524/204; 524/242
[58] Field of Search ................ 524/204, 242; 523/135

[56] References Cited

U.S. PATENT DOCUMENTS

| | | | |
|---|---|---|---|
| 3,341,464 | 9/1967 | Susi et al. | 524/204 |
| 3,484,467 | 12/1969 | Susi et al. | 524/204 |
| 3,519,462 | 7/1970 | Bristol et al. | 117/33.3 |
| 3,875,199 | 4/1975 | Bloom | 260/429 |
| 4,246,374 | 1/1981 | Kopchik | 525/242 |
| 4,727,117 | 2/1988 | Hallden-Abberton et al. | 525/343 |
| 5,126,409 | 6/1992 | Jerman et al. | 525/329.9 |
| 5,182,409 | 1/1993 | Takuma et al. | 556/146 |
| 5,210,122 | 5/1993 | Fontana et al. | 524/204 |

FOREIGN PATENT DOCUMENTS

| | | |
|---|---|---|
| 55-58586 | 5/1980 | Japan . |
| 55-58587 | 5/1980 | Japan . |
| 56-104487 | 8/1981 | Japan . |
| 60-34833 | 2/1985 | Japan . |
| 60-54892 | 3/1985 | Japan . |
| 1566716 | 3/1977 | United Kingdom . |

OTHER PUBLICATIONS

*Polymer Degradation and Stability*: 3 (1980–81) 383–396.
PCT WO90/12019 Oct. 1990.

*Primary Examiner*—Veronica P. Hoke
*Attorney, Agent, or Firm*—Roger K. Graham

[57] ABSTRACT

Decreasing the transmittal of near infra-red radiation through transparent glassy polymers, such as methacrylic ester polymers or those containing a high proportion of N-methyl dimethylglutarimide units, by use of a blended absorber is extremely difficult to accomplish because of the thermal instability of such absorbers under conditions necessary to process the glassy polymer. Use of very low levels of a specific class of thermally stable additives produces a thermally stable polymer blend which may be converted into transparent sheet exhibiting lowered transmittal of near infra-red radiation and useful for many glazing applications.

16 Claims, No Drawings

NEAR INFRA-RED ABSORBING THERMALLY STABLE POLYMER BLEND

This invention relates to a melt-processed, glassy, transparent blend of a polymer of N-methyl dimethylglutarimide or of methyl methacrylate with an effective and thermally stable absorber of near infra-red (NIR) radiation, so that the resulting polymer may be used for glazing requirements where the lowering of NIR transmission reduces the heat-up of the interior of a dwelling or vehicle when the glazing is exposed to solar radiation. The glazing is especially useful for automotive applications.

A number of NIR absorbers are known to be useful with glassy thermoplastics for uses such as controlling transmission of NIR through thermoplastics employed as windows for houses, offices, shops, greenhouses, automobiles, vans, trunks, aircraft, and the like. Bis(4-substituted thiobenzil) metal derivatives, such as of nickel, are taught for this purpose for certain polymers in a series of patents to Bloom, of which U. S. Pat. No. 3,875,199 is representative. In processing thermoplastics containing additives, it is most desirable for economic reasons and for thorough distribution of the additives, to incorporate the additive directly into the molten polymer, either during the preparation of a blend (pellets, granules, powder) which can be re-molded or during the preparation of the final molded or extruded object. The problem is that there were no known NIR absorbers which are thermally stable under melt processing conditions, particularly for the specific weatherable matrix polymers, i.e., (poly(N-methyl dimethylglutarimides) or poly(methyl methacrylate).

I have now found NIR-absorbers sufficiently thermally stable for use in a melt-processed blend, so that they may be processed into thermoplastics such as poly(N-methyl dimethylglutarimides) or poly(methyl methacrylate) and passed through thermoplastic processing operations without degradation of their NIR-absorbing utility.

I have discovered a thermally stable melt-processed blend comprising (a) a polymer containing at least 40 mol % of N-methyl dimethylglutarimide units of the formula

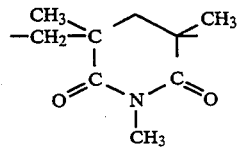

and (b) from 0.0005 parts to 0.10 parts, per 100 parts of the polymer, of bis(4-dialkylaminodithiobenzil) nickel, wherein the alkyl group may be from one to twelve carbon atoms, and wherein the thermally stable melt-processed blend is processed at from 245° to 330 ° C. Preferred embodiments of this discovery include the above blend wherein the polymer contains at least 40 mol % of N-methyl dimethylglutarimide units, and less than 0.5 mol % combined of methacrylic acid units and dimethylglutaric anhydride units, the remaining units being methyl methacrylate units. Such polymers may be produced by the removal of residual acid and/or anhydride groups by the alkylation or esterification technology taught in Hallden-Abberton et al., U.S. Pat. No. 4,727,117, such as by treating the polyglutarimide with methyl orthoformate or dimethyl carbonate.

Another preferred embodiment is with the untreated polyglutarimide as prepared by the teachings of Kopchik, U.S. Pat. No. 4,246,374, wherein a polymer of methyl methacrylate is treated in an extruder with monomethylamine. This preferred embodiment includes a blend wherein the polymer contains at least 40 mol % of N-methyl dimethylglutarimide units, from 0.5 to 5 mol % combined of methacrylic acid units and dimethylglutaric anhydride units, the remaining units being methyl methacrylate units. Especially preferred is when either blend has a residual content of methylamines below 50 parts per million, based on polymer, which may be accomplished, e.g., by very careful devolatilization in an extruder or by a methanol treatment of the molten polymer in the extruder, but prior to the addition of the NIR-absorber, as taught in Jerman et al., U.S. Pat. No. 5,126,409.

The polyglutarimide used herein is that formed from the imidization with monomethylamine of poly(methyl methacrylate) homopolymer or a copolymer of methyl methacrylate with low levels (less than 5 weight percent) of a co-monomer such as methyl acrylate, ethyl acrylate, and the like. The starting polymer may be of a range of molecular weights, but for a combination of appropriate melt viscosity during the imidization and the final extrusion operations, it is preferred the molecular weight of the starting polymer be from 80,000 to 180,000, although materials outside this range may be used. A preferred range is from 110,000 to 150,000. When conducted as taught by the noted Kopchik and Hallden-Abberton et al. patents, the polyglutarimide is of a similar molecular weight and little or no degradation of molecular weight occurs during the conversion to imide and the final extrusion into sheet or other object.

Polyglutarimides or polymethacrylimides, are conveniently prepared, inter alia, by reaction of poly(methyl methacrylate) with ammonia or an amine, such as in an extruder. The preferred polymer, prepared by use of monomethyl amine, has an attractive combination of weatherability, clarity, thermoformability, non-injurious breakage behavior, reasonable toughness, high modulus, and high glass transition temperature which makes it a promising candidate for automotive windows and the like wherein high temperatures are developed in the interior when exposed to solar conditions in warm climates. In the following text, PGI shall be used to designate polymers wherein at least 40 mol % of the units, preferably at least 50% of such units, and most preferably at least 70% of such units, are N-methyl dimethylglutarimide units. The higher levels of N-methyl dimethylglutarimide units result in higher heat distortion temperatures for the blends, useful when exposure to heat as well as light is contemplated. Other means are known to the art to prepare such PGIs, such as imidization of solid polymer, or in aqueous suspension, or in solution, but any PGI polymer resulting from such syntheses must still be processed by converting to a molten thermoplastic prior to the formation of useful objects.

The polyglutarimide to which the NIR additive is to be added may be a preformed polymer in the form of pellets, possibly containing other additives, such as lubricant, phosphite thermal stabilizer, stabilizer against ultraviolet degradation, and the like. However, to avoid another thermal processing step, it is preferred that the NIR additive of the present invention, along with any other additives, be added at the end of the imidization reaction, which reaction is conducted as described in the incorporated patents. That is, the poly(methyl methacrylate) is heated in an appropriate devolatilizing extruder, is treated with an appropriate amount of monomethyl amine, excess amine and reaction products such as methanol are removed, preferably the acid and anhydride content of the polymer is reduced by addition of an appropriate alkylating or esterifying agent, the polymer is again devolatilized, and the additive package is then added to the molten polyglutarimide, which at the point of the process is within the temperature ranges claimed. Use of lower temperatures will result in too high a viscosity for the molten polymer and it will not process well into pellets or sheet; use of too high a temperature can make the polymer too fluid, as well as possibly contributing to thermal degradation and/or discoloration.

It is preferred for best retention of NIR-absorbing ability that the polyglutarimide either contain low levels of residual amines, preferably below 50 ppm, based on polymer, or that sufficient acid be present, either in copolymerized form, such as in the polyglutarimide where the number of acid groups has not been lowered by alkylation or esterification, or by use of an appropriate acid additive. Stearic acid and similar long-chain aliphatic acids are useful for this purpose, serving both to neutralize the amines and to function as lubricants during processing. The amines present in the polyglutarimide are a mixture of monomethylamine reactant and dimethylamine and trimethylamine, the later two formed in the imidization process.

An alternative method of applying additives for optical purposes, well-known to the art, is to incorporate the additive into a separately applied surface layer over the matrix plastic. My invention contemplates adding the additive to a melt-processed blend subsequently converted to a thin sheet or film for laminating to a unstabilized matrix polymer. A method which avoids melt-processing, and is thus outside the scope of the invention, is to dissolve the additive in a coating solution or a monomer, and then apply the solution as a film-forming layer or polymerize the monomer to form a coating. Unfortunately many of these additives are insoluble in conventional coating bases or in monomers, and require the high temperatures achieved in melt-mixing to cause uniform dispersion. At such temperatures, many of the known NIR additives decompose.

The levels of bis(4-dialkylaminodithiobenzil) nickel are preferably from 0.005 to 0.10 parts per 100 parts of polyglutarimide, although higher levels may be used at additional cost, and lower levels may be used where limited blockage of NIR radiation is acceptable. Such blends may further contain from 0.1 to 0.5 parts, based on polymer, of a carboxylic acid containing at least ten carbon atoms, such as stearic acid, as a lubricant for molding of the blend. Other known lubricants, such as stearyl alcohol, stearyl stearamide, and the like, may also be used. The blends may further contain an effective amount (up to 50 weight percent based on the organonickel complex) of an organophosphite thermal stabilizer, such as a triaryl phosphite or a trialkarylphosphite, for protection against discoloration of the blend on extrusion and molding. Excessive amounts of such phosphites, which are known to be thermal stabilizers for polyglutarimides without NIR absorbers, add to thermal degradation of the polyglutarimide-NIR absorber blend.

In a preferred embodiment, the blend further may contain up to 2.0 weight percent based on polymer of one or more ultra-violet stabilizers selected from the group consisting of hindered amine light stabilizers (commonly known as HALS compounds), benzotriazoles, hydroxybenzophenones, or hindered piperazinones. The present invention includes the use of lubricants, phosphite stabilizers, and ultra-violet absorbers singly or in various combinations.

Preferred is the blend wherein the bis(4-dialkylaminodithiobenzil) nickel is bis(4-dimethylaminodithiobenzil) nickel or bis(4-diethylaminodithiobenzil) nickel. However, the alkyl groups may be any of one or more alkyl groups, such as n- butyl, i-butyl, s-butyl, t-butyl, propyl, 2-ethylhexyl, isodecyl, and the like, of from 1 to 12 carbon atoms. Also preferred is the blend wherein the amount of bis(p-dialkylaminodithiobenzil) nickel is 0.0015 to 0.03 parts, based on polymer, and especially preferred is the blend wherein the amount of bis(4-dialkylaminodithiobenzil) nickel is 0.005 to 0.015 parts, based on polymer.

As a major use of such blends will be in automotive and other glazing, a preferred form of the blend is as an extruded transparent sheet. The sheet may be further thermoformed for use in curved windows, windshields, skylights, etc.

I have further discovered a thermally stable melt-processed blend comprising (a) a polymer containing at least 85 weight % of units derived from methyl methacrylate, preferably a homopolymer of methyl methacrylate or a copolymer of methyl methacrylate with less than 10 weight % of units derived from methyl acrylate, ethyl acrylate, or butyl acrylate, and (b) from 0.0005 to 0.10 parts, per 100 parts of the polymer, of bis(4-dialkylaminodithiobenzil) nickel, wherein the blend has been melt-processed at a temperature exceeding 200° C. Processing of methyl methacrylate homopolymers or copolymers containing mainly methyl methacrylate into useful objects such as sheet, light fixtures, lamp housings, and the like requires processing temperatures in the range of 200° to 300° C., most commonly 220° to 280° C.

As in the case of the glutarimide polymers, the blend may further contain from 0.1 to 0.5 parts, based on polymer, of a lubricant, preferably a carboxylic acid containing at least ten carbon atoms, and/or an effective amount (up to 50 weight percent based on the organonickel complex) of an organophosphite thermal stabilizer, and/or up to 2.0 weight percent based on polymer of one or more ultra-violet stabilizers selected from the group consisting of hindered amine light stabilizers, benzotriazoles, phenyl salicylates, hindered piperazinones, and a-hydroxybenzophenones. The preferred bis(4-dialkylaminodithiobenzil) nickel is bis(4-dimethylaminodithiobenzil) nickel or bis(4-diethylaminodithiobenzil) nickel. Also preferred is the blend wherein the amount of bis(p-dialkylaminodithiobenzil) nickel is 0.0015 to 0.03 parts, based on polymer, and especially preferred is the blend wherein the amount of bis(p-dialkylaminodithiobenzil) nickel is 0.005 to 0.015 parts, based on polymer.

The blend of the methyl methacrylate polymer and the bis(4-dialkylaminodithiobenzil) nickel may be in the form of an extruded or melt-calendered sheet. It may be further thermoformed. It has utility in the form of an automotive window or transparent panel. The invention is not dependent on the mode of preparation of the poly(methyl methacrylate), since for extrusion or molding uses, the polymer must be converted to a molten thermoplastic.

The polymer may contain other dyes or pigments. The polymer may also contain an inert carrier for the NIR absorber to aid in the addition of such low levels. Certain thermally stable unsaturated polyesters are known for this purpose. Further uses apart from glazing for such NIR-absorbing plastics include safe-light filters for NIR-sensitive photographic material, control of temperature for growing plants or sprouting seeds, optical recording materials, or filters for semi-conductor photocells.

Some embodiments of the invention will now be introduced in the following Examples, wherein all parts are parts by weight unless otherwise noted, and all temperatures are in degrees Centigrade.

The polyglutarimide used in the examples is a poly(N-methyl dimethyl glutarimide) with an imide content of ca. 75 % and ca. 5 % combined methacrylic acid/methacrylic anhydride content. In most examples, the acid and anhydride content of the polyglutarimide has been reduced below ca. 0.5 % by reaction with dimethyl carbonate. Some polymers studied were "under-capped" by use of less than the stoichiometric amount of the dimethyl carbonate. In these polyglutarimides, some traces of residual amines (mono-, di- and/or trimethylamine) remain. Presence of an acid lubricant, such as stearic acid, aids in stabilizing the NIR absorber against any gain in color or loss in NIR absorbing efficiency from re-processing samples containing free amine.

The chemicals tested as near infra-red absorbers were obtained from commercial sources. All potentially viable NIR absorbing additives were first tested in a poly(N-methyl dimethylglutarimide of ca. 76% imide content and less than 0.5 free acid or anhydride, of MW ca. 150,000. The additives were physically mixed into the imide, having first been dry-blended with a small amount of a finely powdered dimethylglutarimide, and then melt blended on the Killion extruder. Plaques were injection molded on a one-ton Arburg molding machine at different temperatures to determine thermal stability. Thermal stability was measured via degradation of the NIR absorber gleaned from the Perkin-Elmer UV/-VIS/NIR spectra and color of the plaques. All tests were carried out on standard ASTM (76.2 mm.×50.8 mm.×3.17 mm.) injection molded plaques. TWLT (total white light transmission), YI (yellowness index), and haze values were determined on the Hunter Lab calorimeter. Solar Transmission values were calculated on polyglutarimide plaques in accordance with ASTM D1003 Procedure B under Illuminant C. Luminous Transmission values were calculated on polyglutarimide plaques in accordance with ASTM 424 Procedure A1, Weighting A2. The term Visible transmittance is used interchangeably with Luminous transmittance (the actual term used in the ASTM test). Wavelength vs. Transmission spectra were determined on a Perkin-Elmer Lambda spectrophotometer.

EXAMPLES 1-5

These examples demonstrate the thermal stability of the bis(4-dialkylaminodithiobenzil) nickel materials as judged by NIR and visible appearance of the resulting thermally processed blends with polyglutarimides. To a polyglutarimide (76% imide groups, MW 150,000) in pellet form prepared front poly(methyl methacrylate) and monomethylamine in an extruder, which PGI had been treated with dimethyl carbonate to lower the acid content to ca. 1%, and further had been re-extruded to lower the free amine content below 10 ppm, was added bis(4-diethylaminodithiobenzil) nickel at 0.09 parts per hundred of resin (the low level was added in a dry blend with a small amount of finely divided PGI resin). After extrusion and molding with temperatures in the range 249° C.-271° C., plaques of good color and low haze were obtained whose NIR spectra varied only slightly from the value supplied by the manufacturer. (Example 1).

Similar thermally stable blends are obtained with (a) processing at temperatures of ca. 249° C. throughout (Example 2); substitution of bis(4-dimethylaminodithiobenzil) nickel for bis(4-dialkylaminodithiobenzil) nickel (Example 3); substitution of an "uncapped" polyglutarimide of 2.15 % total acid content for the "capped" imide of Example 1 or Example 3 (Examples 4–5).

EXAMPLES 6-7

These two examples demonstrate the deleterious effect of amine and the ability to counteract that effect with the presence of acid. First, the polyglutarimide of Examples 4 and 5 contained 28 ppm of trimethylamine, yet the color was not adversely affected, believed due to the presence of the free acid groups in the polymer. In Example 6, a polyglutarimide with a free acid content of 0.34 % but which contained 30 ppm trimethylamine when processed as in Example 1 showed significant color degradation both in the visible and the NIR region. In Example 7, the sample was processed with the further addition of 1.0 parts stearic acid lubricant, and the color retention was acceptable.

EXAMPLES 8-9

In these comparative Examples, it is shown that thermal stability per se is not sufficient for blends which require optical clarity. Iron phthalocyanine and silicon phthalocyanine dichloride proved to be very stable under polyglutarimide molding conditions. But although both phthalocyanines absorbed very strongly in the NIR range at low levels, they had a narrow absorption band at around 650 nm, and caused haze in the molded plaques.

EXAMPLES 10-11

In these comparative Examples are shown materials known to have some utility in NIR uses not requiring thermal processing. The complex of phenylenediamine/hexafluoroantimonate has appropriate spectral characteristics to serve as a NIR absorber, as does the mixture of $SnCl_6$ and dibutylphosphate. However, both materials did not survive the thermal processing step in the polyglutarimide, giving color changes, inhomogeneity of color, high haze, and splay.

EXAMPLES 12-13

These examples show the efficacy of bis(4-diethylaminodithiobenzil) nickel as a stable NIR absorbent for poly(methyl methacrylate). A blend of 75 parts of bis(4-diethylaminodithiobenzil) nickel was made with a homopolymer of methyl methacrylate (no other stabilizers present) in pellet form and the blend processed at temperatures of 232° C., 249° C., and 260° C. The spectral curves from 600 to 1500 nanometers were essentially unchanged from that which an unheated control would exhibit. At 75 ppm (0.0075 parts per hundred of resin), a plaque processed at 480° C. exhibited 72% visual transmittance and 58% solar transmittance.

EXAMPLES 14-15

These comparative examples show the ineffectiveness of other known NIR absorbers after thermal processing with poly(methyl methacrylate). As taught in U.S. Pat. No. 3519462, the complex of phenylenediamine/hexafluoroantimonate has appropriate spectral characteristics to serve as a NIR absorber, as does the mixture of SnCl$_6$ and dibutylphosphate. However, both materials did not survive the thermal processing step even at the lower processing temperatures of the poly(methyl methacrylate). The main difficulty was that as changes as small as 5° C. in processing led to a noticeable change in visible transmittance and UV absorbance.

I claim:

1. A thermally stable melt-processed blend comprising:
   (a) a polymer containing at least 40 mol % of N-methyl dimethylglutarimide units of the formula

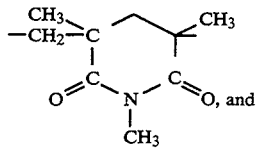

(b) from 0.0005 to 0.10 parts, per 100 parts of the polymer, of a bis(4-dialkylaminodithiobenzil) nickel, wherein the thermally stable melt-processed blend is processed at from 245° C. to 330° C.

2. The blend of claim 1 wherein the polymer contains at least 40 mol % of N-methyl dimethylglutarimide units, less than 0.5 mol % combined of methacrylic acid units and dimethylglutaric anhydride units, the remaining units being methyl methacrylate units.

3. The blend of claim 1 wherein the polymer contains at least 40 mol % of N-methyl dimethylglutarimide units, from 0.5 to 5 mol % combined of methacrylic acid units and dimethylglutaric anhydride units, the remaining units being methyl methacrylate units.

4. The blend of claim 2 or 3 wherein the residual content of methylamines is below 50 parts per million, based on polymer.

5. The blend of claim 2 containing from 0.1 to 0.5 parts, based on polymer, of a carboxylic acid containing at least ten carbon atoms.

6. The blend of claim 1 wherein the bis(4-dialkylaminodithiobenzil) nickel is bis(4-dimethylaminodithiobenzil) nickel or bis(4-diethylaminodithiobenzil) nickel.

7. The blend of claim 1 in the form of an extruded sheet.

8. The sheet of claim 7 which has been thermoformed.

9. The sheet of claim 7 in the form of an automotive window or transparent panel.

10. The sheet of claim 8 in the form of an automotive window or transparent panel.

11. A thermally stable melt-processed blend comprising:
    (a) a polymer containing at least 85 weight % of units derived from methyl methacrylate, and
    (b) from 0.0005 to 0.10 parts, per 100 parts of the polymer, of bis(4-dialkylaminodithiobenzil) nickel, wherein the blend has been melt-processed at a temperature exceeding 200° C.

12. The blend of claim 11 wherein the bis(4-dialkylaminodithiobenzil) nickel is bis(4-dimethylaminodithiobenzil) nickel or bis(4-diethylaminodithiobenzil) nickel.

13. The blend of claim 11 in the form of an extruded or melt-calendered sheet.

14. The sheet of claim 13 which has been thermoformed.

15. The sheet of claim 11 in the form of an automotive window or transparent panel.

16. The sheet of claim 14 in the form of an automotive window or transparent panel.

* * * * *